May 14, 1935.  P. N. CHERPES ET AL  2,001,093
BUMPER MECHANISM
Filed Feb. 1, 1934     3 Sheets—Sheet 1
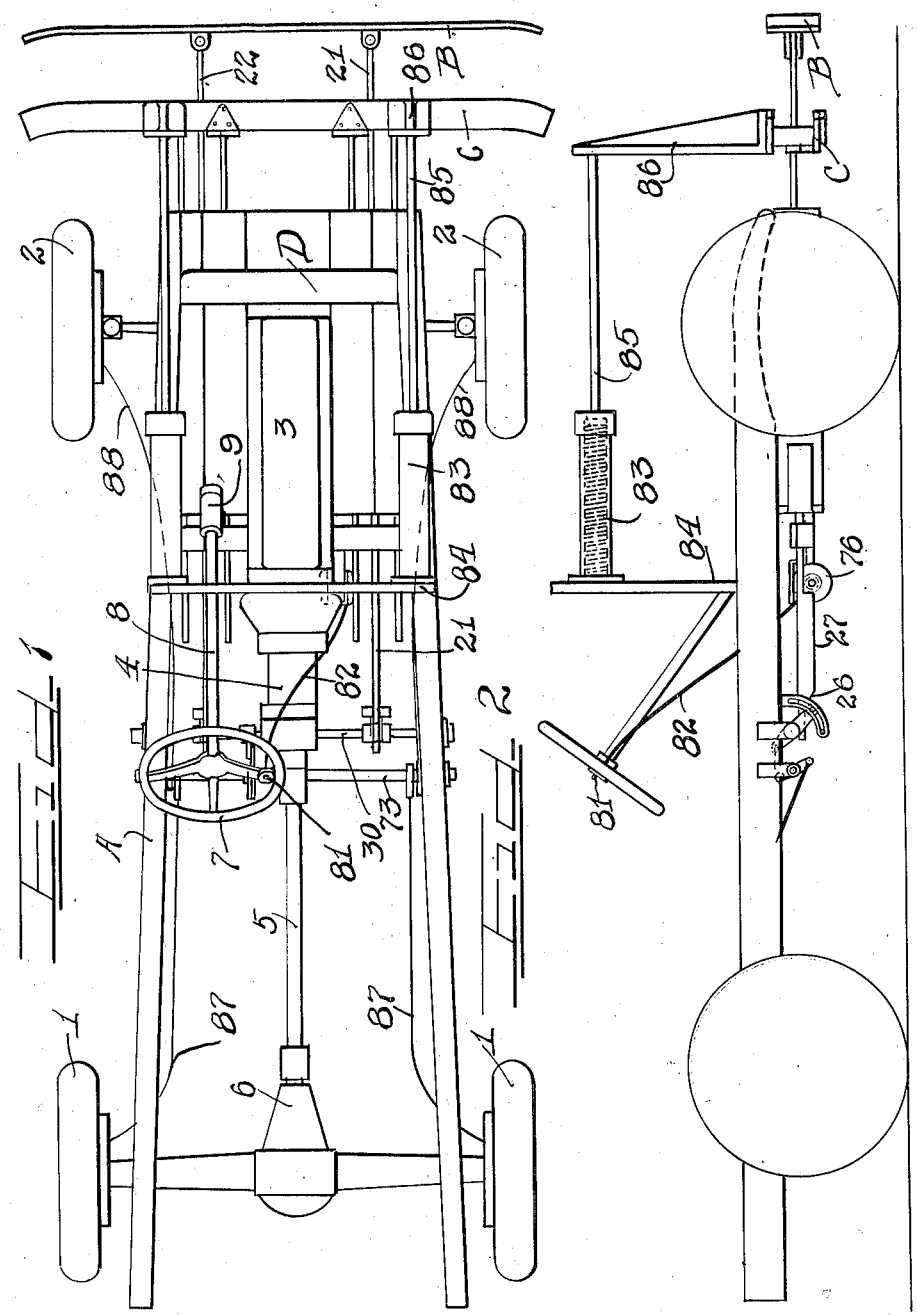
Inventors
Peter N Cherpes
Christ H. Kobbias

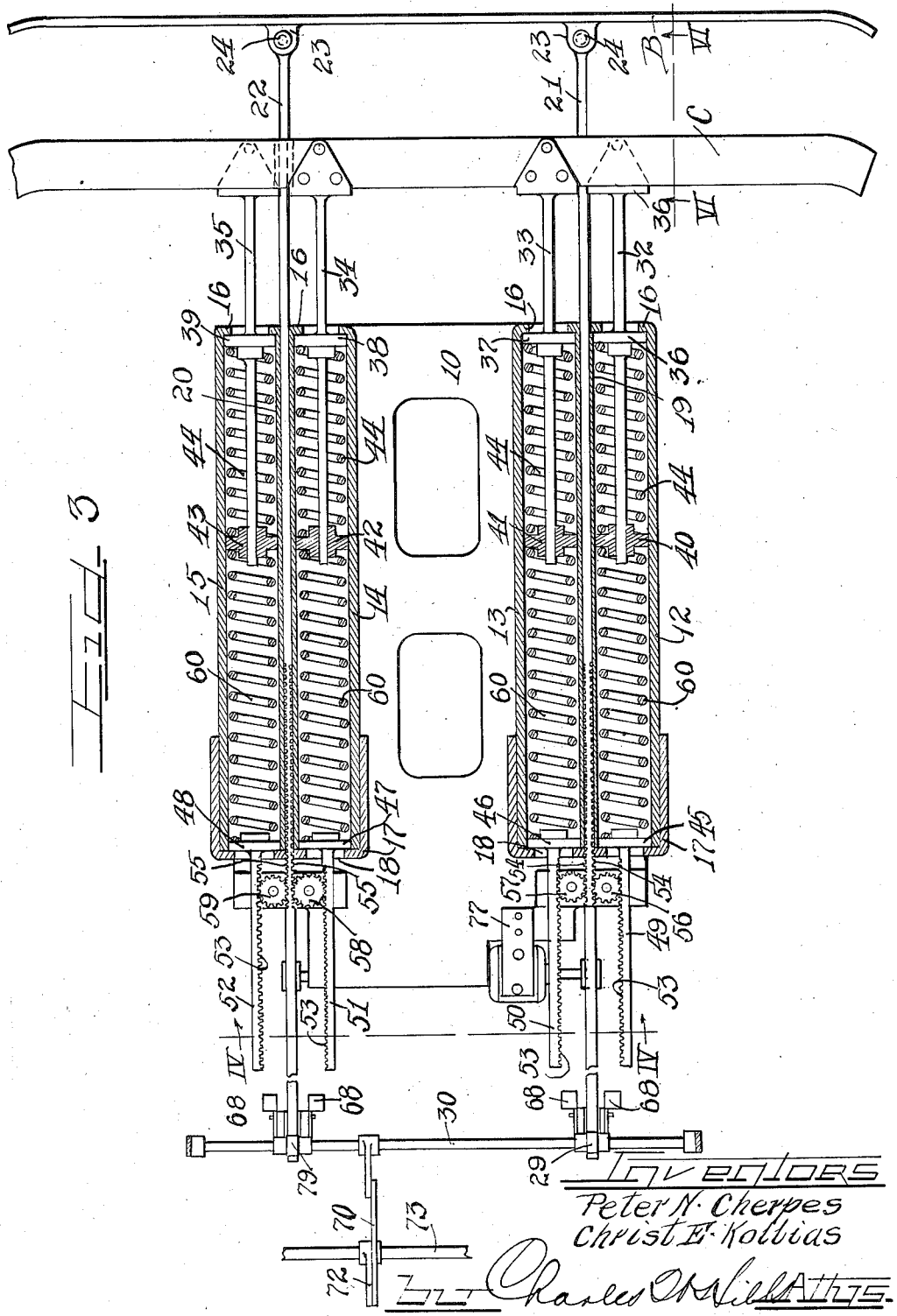

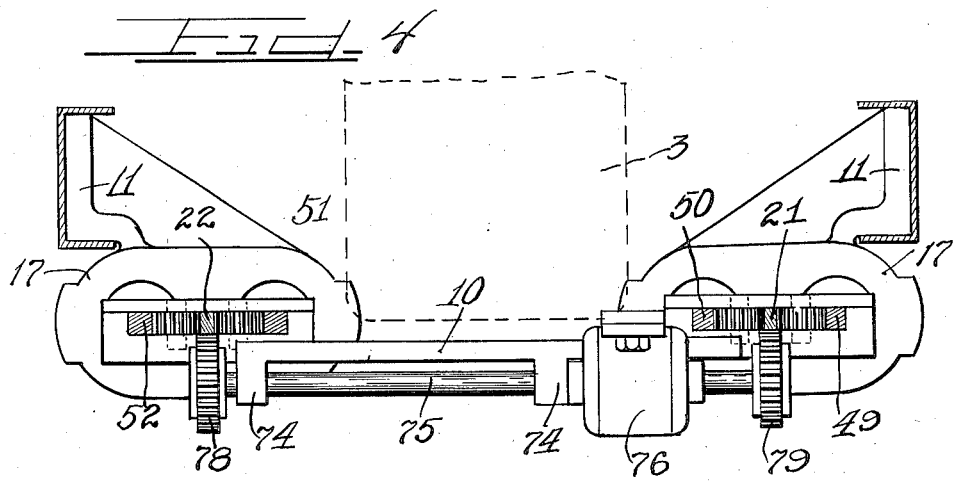
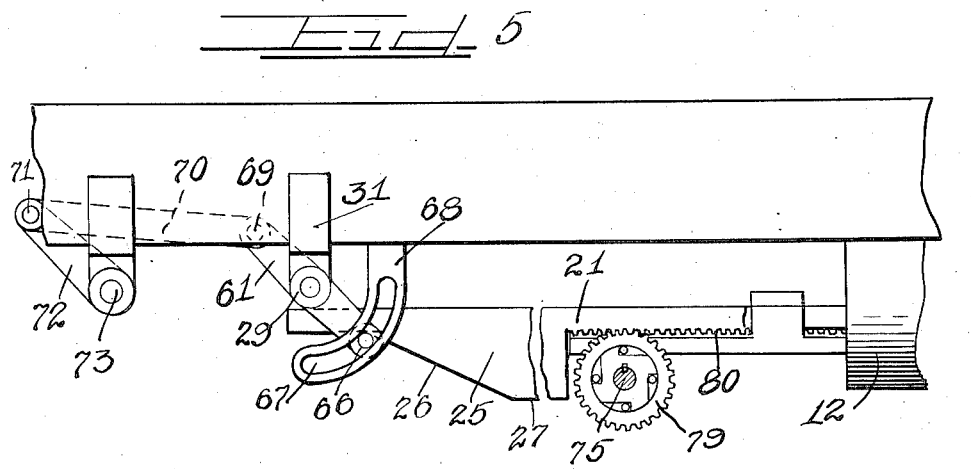
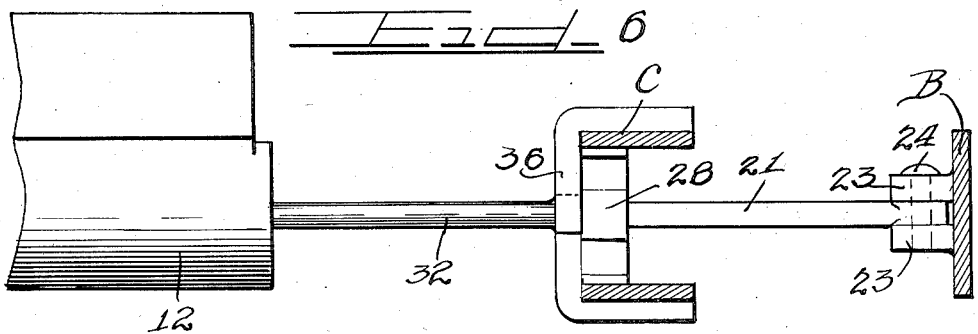

Patented May 14, 1935

2,001,093

UNITED STATES PATENT OFFICE 2,001,093

BUMPER MECHANISM

Peter N. Cherpes and Christ E. Kollias, Chicago, Ill.

Application February 1, 1934, Serial No. 709,286

5 Claims. (Cl. 180—83)

The present invention relates to bumper mechanism and more particularly to bumper mechanism for automotive vehicles.

The present invention is concerned with mechanism wherein a bumper is movably mounted on an automotive vehicle for automatically applying the vehicle brakes whenever the bumper encounters an obstruction.

The invention further contemplates the provision of a double bumper construction wherein two bumpers are mounted in horizontally spaced relation and both of which are movably mounted on a vehicle, so that under impact the outer bumper is moved against the inner bumper and both are moved together, together with means for absorbing the shocks of impact in such manner that the shocks may be quickly absorbed and the occupants as well as the vehicle protected against accidents.

An object of the present invention is to provide an automotive vehicle bumper which is movable inwardly and outwardly with respect to the vehicle and wherein cushioning means are provided for absorbing shocks of impacts.

Another object of the invention is to provide a double bumper construction for automotive vehicles, wherein two horizontally spaced bumpers are sequentially inwardly movable under impact, together with cushioning means which are compounded to increase the resistance to impact shocks.

A further object of the invention is to provide a double bumper construction for automotive vehicles wherein one bumper is moved a certain distance under impact into contact with a second bumper and then both moved together, together with shock absorbing means which come into play in sequential order, to gradually build up resistance to bumper movement and thereby absorb the shocks of impact and reduce the risk of injury to the vehicle and its occupants.

A still further object of the invention is to provide a bumper construction wherein a bumper is movable under impact, together with means for applying the vehicle brakes when the bumper is so moved, without intervention of the vehicle operator.

A still further object of this invention is to provide a novel, electrically operated brake applying mechanism.

Generally speaking, the invention contemplates the provision of two bumpers, arranged one ahead of the other, at the front of an automotive vehicle, and which bumpers are adapted for inward movement under impact. The invention further contemplates the provision of cushioning or shock absorbing means separately operable by movements of the two bumpers and when the two bumpers are moved together, the shock absorbing action is compounded and thereby resistance to impact shocks is quickly built up to a point where the vehicle is protected against injury.

The invention further contemplates the provision of connections between one of the movable bumpers and the brake applying mechanism, so that as soon as the bumper is moved under impact, the brakes will be applied automatically and without intervention of the vehicle operator.

The above, other and further objects of the invention will be apparent from the following description, accompanying drawings, and appended claims.

The accompanying drawings illustrate an embodiment of the present invention and the views thereof are as follows:—

Figure 1 is a top plan view of a diagrammatical representation of a chassis equipped with a bumper construction embodying principles of the present invention.

Figure 2 is a side elevational view of the mechanism illustrated in Figure 1.

Figure 3 is an enlarged central horizontal sectional view with certain parts in plan, of the bumper mountings and shock absorbing or cushioning means.

Figure 4 is an enlarged vertical sectional view taken substantially in the plane indicated by the line IV—IV of Figure 3.

Figure 5 is a fragmental side elevational view of the illustrated form of mechanism employed for operatively connecting one of the movable bumpers to the brake actuating mechanism, for applying the brakes when the bumper is moved under impact.

Figure 6 is a fragmental sectional view taken substantially in the plane in line VI—VI in Figure 3.

The drawings will now be explained.

An automobile frame is represented generally at A and is supplied with the usual rear wheels 1 and front wheels 2. The engine is indicated generally at 3, the transmission at 4, the propeller shaft at 5 and differential at 6. A steering wheel 7 is supported on the usual steering column 8 suitably mounted in a support 9 of well known form.

The double bumper construction of the present invention includes an outer bumper B and an inner bumper C, these being mounted in horizontally spaced relationship, and both are movably mounted so as to move inwardly and outwardly with respect to the vehicle on which applied.

A plate or pan 10 is illustrated as suitably secured to the side frame members of the vehicle by means of brackets 11. The pan 10 extends underneath the engine 3 and along one side carries two longitudinally extending spring housings 12 and 13 and along the opposite sides thereof two similar spring housings 14 and 15. These housings are formed as integral parts of the pan or plate 10 or may be formed as separate units and suitably secured to the pan. The outer ends of the housings are provided with walls designated generally at 16 with openings therein for a purpose to be later explained. The inner ends of the housings are closed by cap members 17, which members 17 have openings 18 for a purpose to be later explained.

The housings 12 and 13 are arranged to provide between them a space 19 while the housings 14 and 15 provide a similar space 20.

The outer bumper B is suported, in the present instance, by two rods 21 and 22, which are similar and which extend through the spaces 19 and 20 between the housings 12 and 13 and 14 and 15, respectively. The front ends of the rods 21 and 22 are secured to the outer bumper B by means of lugs 23 formed on the bumper, and pivot pins 24. The rods 21 and 22 extend beyond the inner ends of the housings a considerable distance, and at their inner ends are provided with cam members 25 having cam surfaces 26 which are inclined downwardly from the inner extremities of the rods. The cam surfaces 26 merge into faces 27 which are parallel to the direction of movement of the rods 21 and 22, as will be later explained.

The rods 21 and 22 are also supported on the inner bumper B by means of enlargements 28 which receive the rods and serve as outer bearing members for the rods. The rods 21 and 22 are guided in the end walls 16 of the housings and also in the end walls of the inner caps 17 of the housings and also at the extreme inner ends. The guide means for the extreme inner ends of the rods 21 and 22, may be observed in Figure 5, wherein a plurality of rollers 29 are supported on a cross shaft 30 suitably secured at 31 to the side frame of the vehicle.

The inner bumper C is supported and guided by pairs of rods 32, 33 and 34, 35, which may be readily observed in Fig. 3.

The rod 32 is suitably secured to the bumper C as by being welded or otherwise fastened to a plate 36 which is riveted or bolted to the bumper bar. The rod 32 enters the opening in the outer end wall 16 of the housing 12, while the rod 33 enters the housing 13. In like manner, the rod 34 enters the housing 14 while the rod 35 enters the housing 15.

It will thus be observed that every one of the rods, supporting the inner bumper C, enters one of the housings and moves therein under certain conditions.

Inwardly of the outer ends of the several housings, the several rods 32, 33, 34 and 35 are provided with heads 36, 37, 38 and 39 respectively, which heads are fixed to the rods inwardly of the housings. Supported near the free extremities of such rods and within the housings, are heads 40, 41, 42 and 43, which are axially movable with respect to the rods. Within the housings and surrounding the several rods, between the fixed heads and the movable heads, are springs 44, arranged one spring to a housing, that is to say, one spring 44 surrounds the rod 32 within the housing 12, a similar spring 44 surrounds the rod 33 within the housing 13, a similar spring 44 surrounds the rod 34 within the housing 14, and a similar spring 44 surrounds the rod 35 within the housing 15, all of said springs being retained between the fixed and movable heads.

Within the several housings and disposed near the inner ends thereof, are pistons 45, 46, 47, and 48 to all of which are attached piston rods, 49, 50, 51 and 52, respectively, which extend through the openings 18 in the end walls of the closure members 17 of the housings. Preferably, although not necessarily, these piston rods are of flat metal and are provided with racks 53 arranged with the racks on one pair facing each other, that is to say, the racks on the piston rods 49 and 50 face each other while the racks on the piston rods 51 and 52 face each other.

The rod 21 of the outer bumper B is, partway of its length, provided with teeth forming racks on each side thereof, as at 54. In like manner, the rod 22 is provided with teeth forming the rack 55 on opposite sides thereof in the same arrangement.

The pan or plate 10 carries pinions for intermeshing with the racks on the piston rods and the adjacent bars of the front bumper.

A pinion 56 meshes with the rack on the piston rod 49 and one of the racks on the rod 21, while a similar pinion 57 meshes with the rack on the other side of the rod 21 and the rack 53 on the piston rod 50. A pinion 58 meshes with the rack 53 on the piston rod 51 and the adjacent rack 55 of the outer bumper rod 22. A similar pinion 59 meshes with the rack 53 on the piston rod 52 and the adjacent rack 55 in the rod 22.

It will thus be observed that whenever the outer bumper B is moved a corresponding movement is imparted to the piston rods.

Within the housings and between the pistons 45, 46, 47 and 48 and the heads 40, 41, 42 and 43, respectively, are springs 60 all of which are similar and arranged with one to a housing.

It will thus be observed that the springs 60 and 44 within the housings are arranged in tandem, and that the springs 60 are compressed by the inward movement of the outer bumper B, while the springs 44 are compressed by the inward movement of the inner bumper C.

The tendency of the springs 44 and 60 to expand maintains the bumpers B and C in outward or normal position.

Adjacent the inner extremities of the bars 21 and 22, and supported on the shaft 30 are cranks 61. In the arrangement of crank shown in Figure 5, the lower ends of the cranks are provided with rollers 66 which travel in arcuate slots 67 of support members 68 fastened to the frame structure of the vehicle. The other ends of the cranks 61 are connected by pivot pins 69 to links 70, the other ends of which are connected by pins 71 to cranks 72 suitably secured to the brake shaft 73. The rollers 66 are disposed to contact the cam surfaces 26 of the cams 25 and the flat surfaces 27, as the rods 21 and 22 are urged inwardly by impact against the outer bumper B.

It will be observed from Figure 5, that as the rods 21 and 22 are moved inwardly under inward movement of the outer bumper B, the cam surfaces 26 rock the cranks 61 in clockwise direction thereby actuating the brake shaft 73 in a direction to apply the brakes. The inclination of the cam surfaces 26 is abrupt so that the brakes will be fully applied before the outer bumper B is moved inwardly into contact with the inner bumper C. In practice, the outer bumper B is disposed approximately 8" beyond the inner bumper C and the cam surfaces 26 are so designed that the brakes are fully applied after the outer bumper B has been moved inwardly a distance of approximately 4".

It will thus be observed that should the automotive vehicle, to which the bumper mechanism of the present invention is applied, strike an obstruction, the outer bumper will be pushed inwardly and the brakes will be applied automatically without intervention of the operator of the vehicle.

Adjacent the inner extremity of the pan or plate B, and formed integrally with the plate, are depending lugs 74 which are laterally spaced and which support a motor shaft 75. A motor 76 is suitably secured to the plate 10, by means of straps 77. The ends of the shaft 75 are provided with pinions 78 and 79 which mesh respectively with racks formed in the under sides of the bars 22 and 21, as illustrated in Figure 5, where pinion 79 meshes with rack 80 formed in the underside of the bar 21. The pinions 78 and 79 are mounted on the shaft 75 by means of overrunning clutches so that the rods 21 and 22 may move in one direction without rotating the motor shaft 75.

The purpose of the motor 76 and its connected parts is to apply the brakes by actuation of the rods 21 and 22 through the operation of the motor. The motor may be controlled by a remotely disposed switch, such as that shown at 81 in Figs. 1 and 2, where the switch 81 is disposed on the steering wheel and a cable 82 connects the switch with the motor 76. Actuation of the motor causes rotation of the pinions 78 and 79 in a direction to move the rods 21 and 22 to the left as viewed in Figs. 1, 2, 3 and 5 of the drawings and thus apply the brakes by engagement of the cam surfaces 26 with the rollers on the cranks 61. This is an easy way of applying the emergency brake in the event the operator of the vehicle does not desire to actuate the usual hand brake lever provided for such purpose.

As an added feature, cylinders 83 may be attached to the dash board 84 and arranged to extend forwardly of the dash. These cylinders contain coiled springs, and a rod 85 enters each of the cylinders where it is provided with a head for compressing the springs under certain conditions. The outer extremities of the rods 85 are connected to upstanding brackets 86 connected to the rear or inner bumper C to prevent the bumper from canting under impact. Preferably the cylinders 83 are arranged underneath the hood in which event apertures therein would be provided through which the rods 85 might extend, as the brackets 86 are disposed ahead of the radiator D of the vehicle.

The operation of the illustrated form of mechanism is as follows:

The parts appear as in normal position.

Suppose an automotive vehicle, to which the bumper mechanism of the present invention is attached, strikes an obstruction such as a post, rail or other abutment, and the operator of the vehicle is too busy or otherwise occupied to immediately apply the brakes, the outer bumper B would then be driven inwardly under force of impact. Such movement, by reason of the provision of the racks on the rods 21 and 22, and the pinions, causes inward movement of the piston rods 49, 50, 51 and 52 thus compressing the springs 60, and to some extent the springs 44 and immediately tending to check the onward movement of the vehicle. Should such impact be sufficient to move the outer bumper B against the inner bumper C and then move both bumpers inwardly, the springs 60 and 44 will work in opposite directions and thus compound the checking effect of the springs and quickly absorb the shock of impact, bring the vehicle to rest.

As soon as the outer bumper B starts its inward movement, the cam surfaces 26 engage the cranks 61 to rock the same and thereby rock the brake shaft 73 in a direction to apply the brakes. This action of the bumper in applying the brakes is an important one as it automatically applies the brakes whenever there is sufficient force applied to the outer bumper to move it a distance of approximately 2" to 4".

While the mechanism here provided serves as automatic means to apply the brakes in case of collision, it also serves as absorbing means to absorb the shock of impact, and thus reduce the accident hazard to a minimum. The quick application of the brakes will prevent the occupants of the vehicle from being thrown forward suddenly against the windshield or other part of the vehicle and thus minimize likelihood of injury to such occupants. As soon as the vehicle is brought to rest and is reversed in direction, the springs 60 and 44 will then become effective to move the bumpers outwardly to normal position ready for another collision.

The brake mechanism may be actuated by manipulation of the switch button 81 which when closed energizes the motor 76 to cause rotation of its shaft 75 and with it cause inward movement of the bars or rods 21 and 22 to rock the cranks 61 in a direction to apply the brakes.

It will be observed that after the outer bumper B has been moved a distance of approximately 2" to 4", the rollers 66 on the crank 61 will have left the inclined cam surfaces 26 and will rest against the horizontal surfaces 27 to allow further inward movement of the rods 21 and 22 under impact.

The lines 87 and 88 indicate diagrammatically the brake actuating rods or cables between the brake shaft 73 and the rear and front brakes respectively.

The addition of the cylinders 83, the springs therein, and the rods 85 connected to the brackets 86 of the bumper C, distributes the impact shocks to the vehicle body, at different vertical points and thus tends to prevent tilting of the vehicle about the point of impact so that the vehicle occupants are not thrown forward against the windshield.

The dimensions set forth herein are for example only, and do not constitute limitations as obviously the dimensions of the present bumper construction, as applied to a small automobile would be different from a bumper construction applied to a large truck.

The invention has been described herein more or less precisely as to details, yet it is to be understood that the invention is not limited thereby, as changes may be made in the arrangement and proportion of parts, and equivalents may be substituted without departing from the spirit and scope of the invention.

The invention is claimed as follows:

1. In an automotive vehicle, in combination, a pair of longitudinally extending housings adjacent one side of the vehicle, a similar pair of longitudinally extending housings adjacent the other side of the vehicle, two springs in tandem in every housing, two bumpers at the front end of the vehicle in horizontally spaced relation and both capable of inward and outward movement with respect to the vehicle, rods supporting and guiding the outer of said bumpers, one of said rods extending along and between the pair of housings adjacent one side of said vehicle, and another of said rods extending along and between the pair of housings adjacent the other side of said vehicle, said rods projecting beyond the inner ends of said housings, two rods supporting and guiding the inner bumper adjacent one end thereof and entering the adjacent housings, two other rods supporting and guiding the other end of said inner bumper and entering the adjacent housings, said four latter rods having spaced heads thereon within the respective housings, the heads adjacent the outer ends of said housings being fixed to said rods and the heads adjacent the inner ends of said rods being movable along said rods, the forward springs in every housing being disposed about the rod therein and between the heads on said rod, pistons within said housings adjacent the inner ends thereof, the rearward spring in every housing being between the piston and movable head in the housing, piston rods connected to said pistons and projecting through the inner ends of said housings, interconnecting means between the rods of the outer bumper and said piston rods for effecting movement of said piston rods in directions opposite to that of the movement of the outer bumper rods for compressing the rearward springs within said housing to cushion the inward movement of said outer bumper under impact, continued movement of said outer bumper under impact causing inward movement of said inner bumper and compression of the forward springs of said housings to compound the cushioning effect of said springs.

2. In an automotive vehicle, a bumper mechanism, said mechanism consisting of two bumpers mounted one ahead of the other in spaced relation and both adapted for inward and outward movement with respect to the vehicle, guide rods extending rearwardly from the outer of said bumpers, other guide rods extending rearwardy from the inner of said bumpers, said rods being disposed in parallel relation, spring housings, tandem springs in said housings, connections between said rods and said springs, one spring in a housing being effective to oppose inward movement of one bumper and another spring in a housing being effective to oppose inward movement of the other bumper, and both springs cooperating to provide cushion means for said inner bumper as the same is moved inwardly by said outer bumper after said outer bumper has been moved against said inner bumper.

3. In an automotive vehicle, in combination, a bumper, rods for mounting said bumper on said vehicle in such manner that the bumper may move inwardly toward the vehicle, said rods extending in a direction of the length of the vehicle, a housing alongside each rod, springs within said housings, a piston within each housing and having a piston rod projecting outwardly of the housing, said piston rods and said bumper rods being provided with racks, a pinion meshing with one bumper rod and one piston rod, a second pinion meshing with the other bumper rod and the other piston rod in such manner that inward movement of the bumper under collision impact compresses the springs in said housings to cushion the impact, said springs within said housings being effective to normally maintain said piston rods fully extended and said bumper in normal outward position, and means operable as said bumper rods are moved inwardly under impact for applying the vehicle brakes, said springs releasing the brakes and returning the bumper to normal outward position when the vehicle is moved away from the impacted object.

4. In an automotive vehicle, in combination, a rocker brake shaft, an auxiliary rocker shaft parallel to said brake shaft, linkage connecting said shafts for simultaneous rocking movement, a crank secured to said auxiliary shaft, a roller carried by said crank, a guide member having an arcuate slot for said roller, a cam disposed for engagement with said roller and adapted to move said crank in a direction to rock said brake shaft to apply the brakes when said cam is moved in one direction, and means carried by the vehicle and operable under collision impact for moving said cam in the manner stated.

5. In an automotive vehicle, in combination, a rocker brake shaft, an auxiliary rocker shaft parallel to said brake shaft, linkage connecting said shafts for simultaneous rocking movement, a crank secured to said auxiliary shaft, a roller carried by said crank, a guide member having an arcuate slot for said roller, a cam disposed for engagement with said roller and adapted to move said crank in a direction to rock said brake shaft to apply the brakes when said cam is moved in one direction, a motor operatively connected to said cam for moving it in the manner stated, and means for controlling said motor.

PETER N. CHERPES.
CHRIST E. KOLLIAS.